(12) United States Patent
Lawandy

(10) Patent No.: US 8,931,701 B2
(45) Date of Patent: Jan. 13, 2015

(54) METHODS AND SYSTEMS FOR AUTHENTICATING AND TRACKING OBJECTS

(75) Inventor: Nabil M. Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 294 days.

(21) Appl. No.: 13/248,417

(22) Filed: Sep. 29, 2011

(65) Prior Publication Data

US 2013/0082108 A1  Apr. 4, 2013

(51) Int. Cl.
*G06K 7/12* (2006.01)
*G06K 19/06* (2006.01)
*B42D 15/00* (2006.01)

(52) U.S. Cl.
CPC *G06K 7/12* (2013.01); *G06K 19/06* (2013.01); *B42D 15/00* (2013.01); *G06K 19/0614* (2013.01)
USPC ...... 235/462.09; 235/494; 235/491; 235/468; 235/462.01

(58) Field of Classification Search
USPC .................. 235/462.09, 462.01, 491
See application file for complete search history.

(56) References Cited

U.S. PATENT DOCUMENTS

| 2003/0005303 | A1* | 1/2003 | Auslander et al. | 713/176 |
| 2005/0269416 | A1* | 12/2005 | Sussmeier et al. | 235/494 |
| 2008/0128492 | A1* | 6/2008 | Roth et al. | 235/380 |
| 2008/0290649 | A1* | 11/2008 | Klein et al. | 283/86 |
| 2009/0134227 | A1* | 5/2009 | Roth | 235/491 |
| 2011/0195235 | A1* | 8/2011 | Kato et al. | 428/195.1 |
| 2011/0283369 | A1* | 11/2011 | Green | 726/30 |

* cited by examiner

*Primary Examiner* — Allyson Trail
(74) *Attorney, Agent, or Firm* — Barlow, Josephs & Holmes, Ltd.

(57) ABSTRACT

In part, the invention relates to a security feature for authenticating an object having an outer surface and an inner surface. The security feature includes a substrate having a length and a width and a two-dimensional code comprising a plurality of two dimensional regions, the plurality of two dimensional regions disposed in the substrate, the two-dimensional code is substantially invisible when inspected during exposure to visible light and readable during exposure to ultraviolet light.

19 Claims, 9 Drawing Sheets

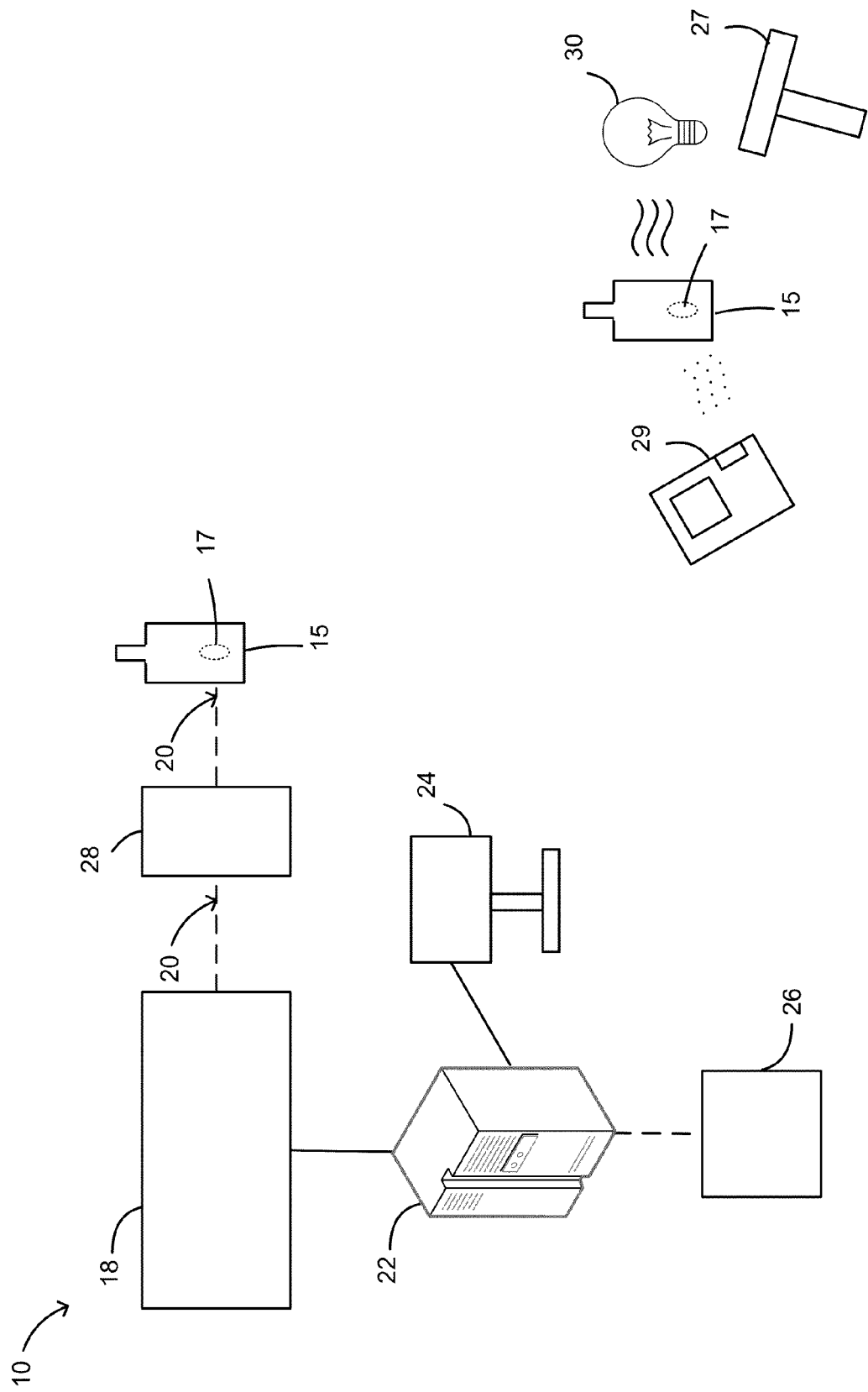

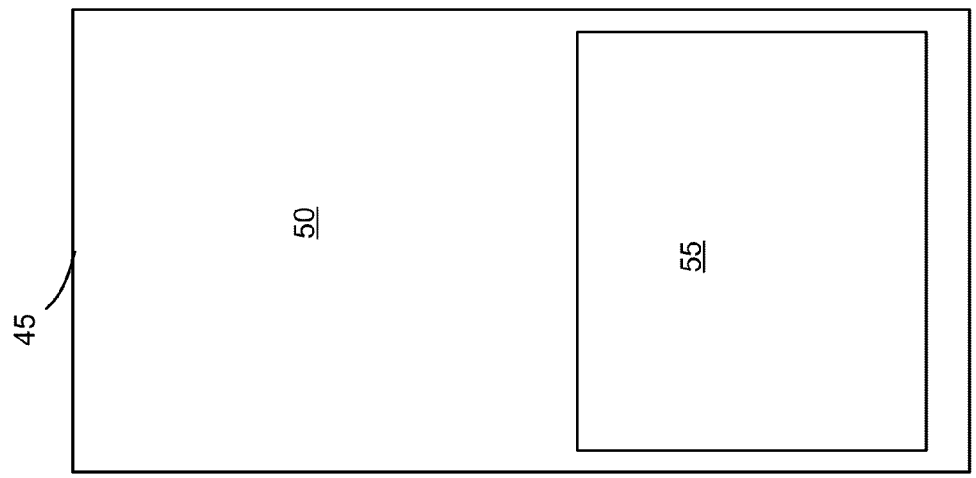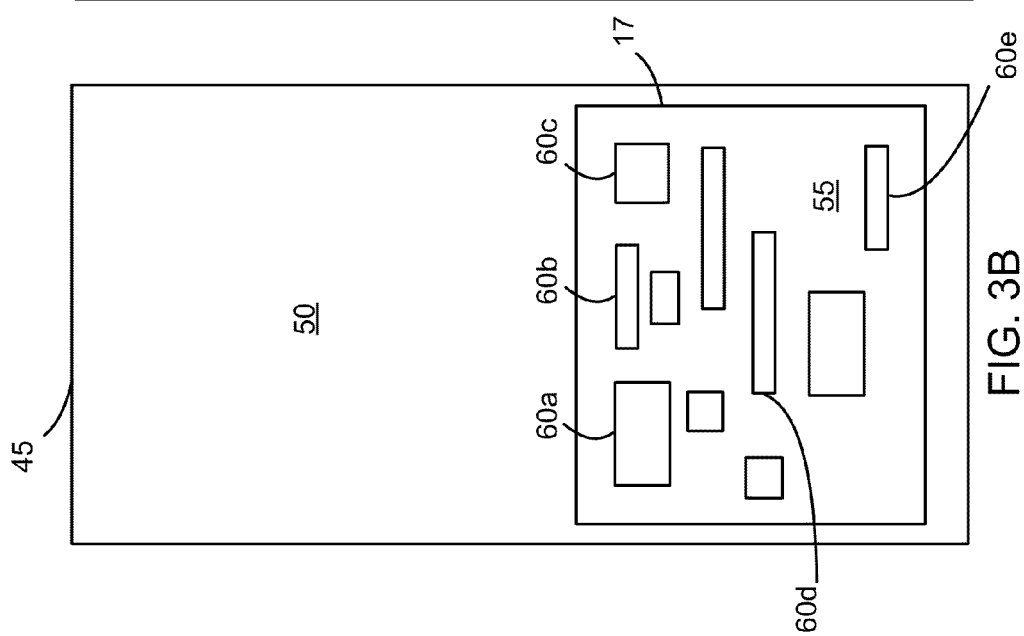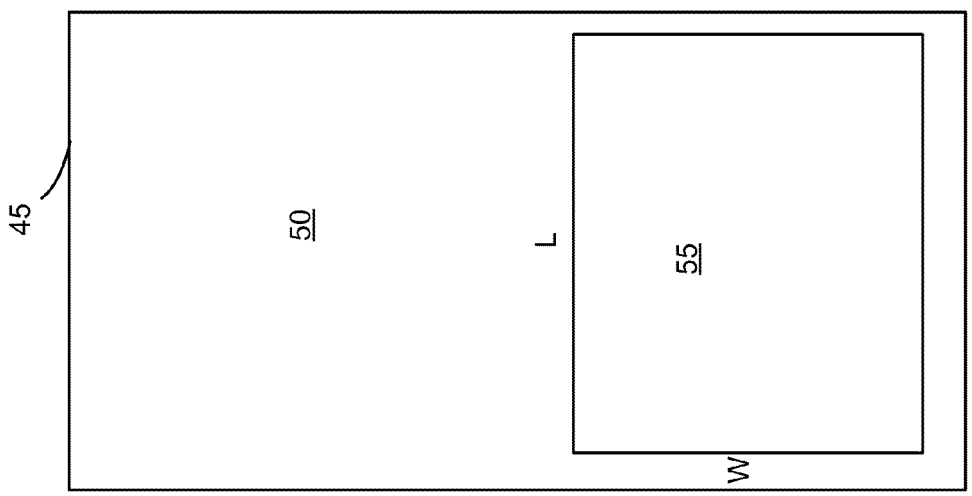

METHODS AND SYSTEMS FOR AUTHENTICATING AND TRACKING OBJECTS

FIELD OF INVENTION

In part, the present invention relates to security markings and more specifically, to selectively detectable codes for tracking and/or authenticating objects.

BACKGROUND

In a world where premium brands and pharmaceuticals, such as vaccines and biologics, command pricing premiums, there is an incentive to engage in various types counterfeiting. Counterfeiting and forgery have become significant concerns in the modern economy and marketplace both for reasons of economic loss as well as health and safety of consumers and the populations served by suppliers. Advances in digital technology, three dimensional printing, and access to various types of micro fabrication facilities have increased the incidence of counterfeited objects and gray market activities, primarily through imitation of security products used on secondary packaging such as boxes.

Retailers, consumers, and manufacturers all rely on the ability to detect counterfeit goods to protect individuals and themselves from economic harm, brand dilution, and other risks associated with counterfeit goods of dubious quality and materials. Common fraudulent activities include counterfeiting goods or reselling diverted merchandise through large scale well organized operations as well as on the Internet.

Similarly, the ability to track an object throughout the world becomes increasingly challenging as markets open up all around the globe with different warehousing arrangements, transportation steps, and distribution schemes.

Accordingly, what is needed are methods which produce codes and markings which are embodied on the primary container or the object itself. These codes and markings are useful for determining whether an object is authentic, for tracking the object through a transportation and distribution chain, for determining whether it was sold by the authorized retailer or their channel partner, and for tracking where the object is within various environments, and doing so from any point in the world.

SUMMARY

In part, the invention relates to systems, devices, security and tracking features and elements, and methods of providing a covert security and tracking marking objects (e.g., bottles, ampules or syringes) to curb the rise in forgery, counterfeiting, and other fraudulent activities relating to various consumer and medical products and consumables. One embodiment of the invention allows for a security feature or code, such as a one or two dimensional bar code, to be encoded or written in or on a substrate without altering the visual appearance of the substrate. The substrate can be composed of, for example, glass, plastic, polymer, crystalline, and the substrate can be part of an object of interest. In some embodiments, the code is written on a portion of the substrate or object which extends into a wall or structural feature of the object. In one embodiment, the code is invisible under both normal and ultraviolet (UV) illumination. For example, in one embodiment the code is only visible if a specific wavelength of UV light is used. Another embodiment provides for the alteration of the Raman scattering signature of the substrate. In addition, as an advantage over other covert authentication schemes, no coatings, liquids, or inks are needed and high speed encoding using highly automated approaches is possible.

One embodiment of the invention includes an electromagnetic radiation or particle (e.g. electrons) irradiation based system suitable for writing codes, such as bar codes and quick response codes (QR), within a substrate or on the surface of the substrate as the basis of a covert security and tracking feature for items of value. These codes are typically not visible when in normal use, but the codes are readable, viewable, and/or scannable when a specific source of illuminating electromagnetic radiation is used along with detection devices. Thus, the codes allow the object to be authenticated and tracked if the code appears and is valid. In addition, the code itself contains information that allows the object to be tracked and additional information of interest to be extracted directly from the code or retrieved from a database or web server with the code as the key for querying the remotely stored information about the object.

In one embodiment, the invention relates to a method of writing a selectively detectable code having a detectable state and an invisible state in a material such that the code is detectable when exposed to bands of electromagnetic radiation and wherein the code is substantially invisible when exposed to ambient levels of visible light. The method includes the step of applying energy to a region of the material where chemical bonds in the region or structural changes have occurred which are substantially invisible when exposed to ambient visible light but that fluoresce or otherwise emitted detectable shifted electromagnetic radiation when properly exposed.

In one embodiment, the invention relates to a security feature for authenticating an object that includes a substrate that includes a first material and having a length (Lg) and a width (Wg); and an authenticatable two-dimensional code that includes at least one region, the at least one region disposed in the first material, wherein the at least one region that includes a second material derived from the first material.

In one embodiment, the two-dimensional code or pattern is configured to be substantially invisible to a person when exposed to visible light and readable during when exposed to electromagnetic radiation that substantially excludes visible light at ambient conditions. In one embodiment, the first material and the second material are non-emissive when exposed to visible light, wherein the second material emits visible light to a greater degree then the first material when exposed to electromagnetic radiation that substantially excludes visible light. In one embodiment, the two-dimensional code is selected from the group consisting of a quick response code, a one-dimensional bar code, a line, a glyph, a logo, a plurality of lines, or a two-dimensional bar code. In one embodiment, the substrate that includes glass selected from the group consisting of silicate glass, nanocrystal doped glass, phosphate glass, silicate phosphate, and borophospate and soda lime glass.

In one embodiment, the second material that includes an electromagnetic radiation responsive element selected from the group consisting of a dopant, a defect, a broken bond or structural change, a compound having a Raman scattering signature that differs from that of the first material. In one embodiment, the substrate further that includes a dopant, the dopant selected from the group consisting of an alkali metal, a nanocrystal, and a semiconductor dopant. In one embodiment, the two-dimensional code has a boundary defined by Lg and Wg and wherein the first material has a first Raman scattering signature and the second material has a second Raman scattering signature that is detectably different from the first Raman scattering signature. In one embodiment, the substrate is part of the object and wherein the object is selected from the group consisting of a bottle, a syringe, a test tube, an ampoule, a container, and a sculpture. In one embodiment, the two-dimensional code that includes identifier information such that the substrate is trackable by scanning the two-dimensional code.

In one embodiment, the invention relates to method of fabricating an authenticable object that includes determining a position within an object that includes a first material for a target area to bound a two-dimensional code; exposing a plurality of locations in the object, within the target area, to a particle or electromagnetic radiation beam, such that a second material is formed from the first material, the two-dimensional code includes a pattern of regions corresponding to the plurality of locations; and associating the two-dimensional code with the authenticable object in a database. In one embodiment, second material emits light to a detectably greater degree than the first material when exposed to electromagnetic radiation that substantially excludes visible light. In one embodiment, the beam originates from a laser and wherein the second material fluoresces when exposed to $\lambda_1$ and does not fluoresce when exposed to $\lambda_2$. In one embodiment, the target region bounds the two-dimensional code. In one embodiment, method further includes the step of exposing the object to $\lambda_1$ and scanning the two-dimensional code using a mobile device. In one embodiment, the method further includes the step of storing data associated with the object in a database, the information accessible after the code has been scanned by a mobile device.

In one embodiment, the invention relates to object encoding system that includes a computer that includes a processor, a memory device, wherein the memory device includes instructions that when executed by the processor cause the processor to: select the time, duration, and pattern of a particle or electromagnetic radiation beam before scanning an object; scan an object with the beam such that the beam is on and off for periods of time; and encode a two-dimensional pattern in the object that is selectively readable when exposed to a wavelength of electromagnetic radiation having a wavelength greater than about 700 nm and less than about 400 nm. In one embodiment, the two-dimensional pattern is selected from the group consisting of a quick response code, a one-dimensional bar code, a line, a glyph, a logo, a plurality of lines, or a two-dimensional bar code. In one embodiment, the object includes an element selected from the group consisting of a dopant, a defect, a broken bond, an electron trap and a hole trap. In one embodiment, the method further includes the step of exposing the object to a wavelength of light $\lambda_1$ and scanning the two-dimensional code using a mobile device.

BRIEF DESCRIPTION OF THE DRAWINGS

The figures are not necessarily to scale, emphasis instead generally being placed upon illustrative principles. The figures are to be considered illustrative in all aspects and are not intended to limit the invention, the scope of which is defined only by the claims.

FIG. 1A is a schematic diagram showing a system suitable for forming a code on or within an object according to an illustrative embodiment of the invention.

FIG. 1B is a schematic diagram showing an object being scanned and having a code that is substantially invisible when exposed to visible light according to an illustrative embodiment of the invention.

FIGS. 3A, 3B, and 3C are schematic diagrams showing a substrate before a code has been formed, after a code has been formed and in the presence of a code illuminating source, and after a code has been formed without a code illuminating source being active, respectively, according to an illustrative embodiment of the invention.

DETAILED DESCRIPTION

Figure 1D:
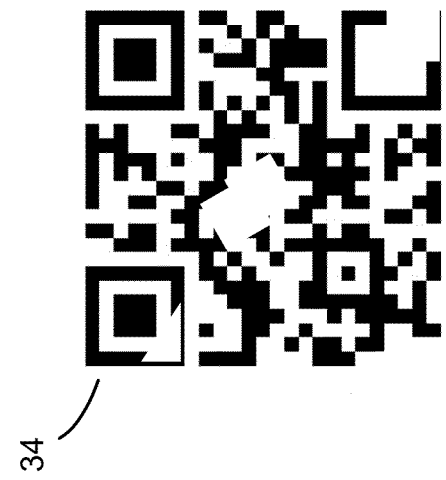
FIG. 1D is a schematic diagram showing an exemplary quick response ("QR") code suitable for writing in a substrate according to an illustrative embodiment of the invention.

The invention will be more completely understood through the following detailed description, which should be read in conjunction with the attached drawings. Detailed embodiments of the invention are disclosed herein; however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In part, embodiments of the invention relate to systems, devices and methods for authenticating and tracking objects having a one or two-dimensional code written in or on the object and which forms part of the object. The code is not visible when viewed by a person under typical lighting conditions. However, in the presence of an ultraviolet light, such as black light, the code or pattern becomes readable. In the case of a Raman signature, the object is scanned and the Raman intensity at a given Raman wavelength is recorded. The intensity modulation can produce a bar code for example as the beam is scanned across the object surface.

For the avoidance of doubt, in this context readable means that it can either be seen by a person or, whether or not a person can see it, the code can be readable by a scanner and/or computer. In one embodiment, a scanner or computer or camera, such as a mobile device camera, can read the code and determine whether or not the object is authentic. The feature of certain code embodiments being substantially invisible when exposed to visible light renders it suitable as a tracking device and as a anti-counterfeiting device or mechanism.

In one embodiment, the invention relates to a laser or optically-based method to track products by creating bar codes (1D or 2D) and quick response ("QR") codes or other selectively detectable patterns or codes in or on the products or their packaging. A volume of an object of interest acts as a writing or encoding medium in which a code or spatial pattern can be written or formed in the outer surface of the object, the inner surface of the object, or some distance in between these two surfaces using appropriate focusing optics. A plurality of two dimensional regions can be changed in a given object of interest wherein the regions constitute the code or pattern. Thus, a first material which makes up a substrate is changed to a second material having detectable optical properties or light emitting properties that differ from the first material.

For a given embodiment, a pattern or code can be written or formed in the substrate using various devices to modify regions or volumes of the object being modified, such as for example, without limitation, a laser, a heating element, an electron beam generator, a lamp, sources paired with patterned masks, and other devices suitable for causing a bond to break or another structural change in the substrate. In one embodiment, the changes affected in regions of an object are such that a code or pattern formed from one or more such regions cannot be seen when exposed to visible light (or another wavelength or band of wavelengths), but that is scannable, readable, detectable or otherwise identifiable when exposed to electromagnetic radiation outside of the visible range of wavelengths (or the visible range of wavelengths). Thus, the pattern or code can be read, detected, scanned or otherwise detected using light having wavelengths in the ultraviolet range (and shorter wavelength bands) and in the infrared range (and longer wavelength bands) in various respective embodiments.

Preferably, the process of forming, writing, or otherwise marking the object is non-destructive in nature and pieces of the object are not removed, worn away, or etched. Instead, the material of the object is changed to another material derived from the first in specific locations. In one embodiment, either the long or short ultraviolet ("UV") response of the object is selectively changed at different location, such as rendering it less responsive to UV or enhancing its responsiveness to UV, according to a pattern. In one embodiment, the pattern can be formed by changing the UV response for different regions relative to other regions in which the UV response is unchanged. In such a method, some regions are targeted and other regions are skipped over by the laser or particle beam used to form the code and remain unchanged. A mask based system can also be used where uniform illumination is used with a series of slots or patterns to allow the encoding bean to pass onto the object. In contrast, in other embodiments, all of the regions can be changed in terms of their UV response, but changed relative to each other in a way such that a readable pattern is present when exposed to UV light. In one embodiment, the object or substrate has defects, dopants, or other structural features that are modifiable by the application of radiation or particles such as electrons. For example, in one embodiment a laser beam is used to structurally modify the object such that it traps electrons in a long-lived state rather than letting them recombine through fluorescence or phosphorescence which is observable by the eye or an imaging detector such as a CCD array.

In another approach, the object or substrate can be modified to create fluorescing or phosphorescing defects which in turn absorb UV or other light and emit at a longer wavelength. In the former case, the intrinsic fluorescence or phosphorescence are quenched locally while in the latter they are enhanced.

Figure 7:
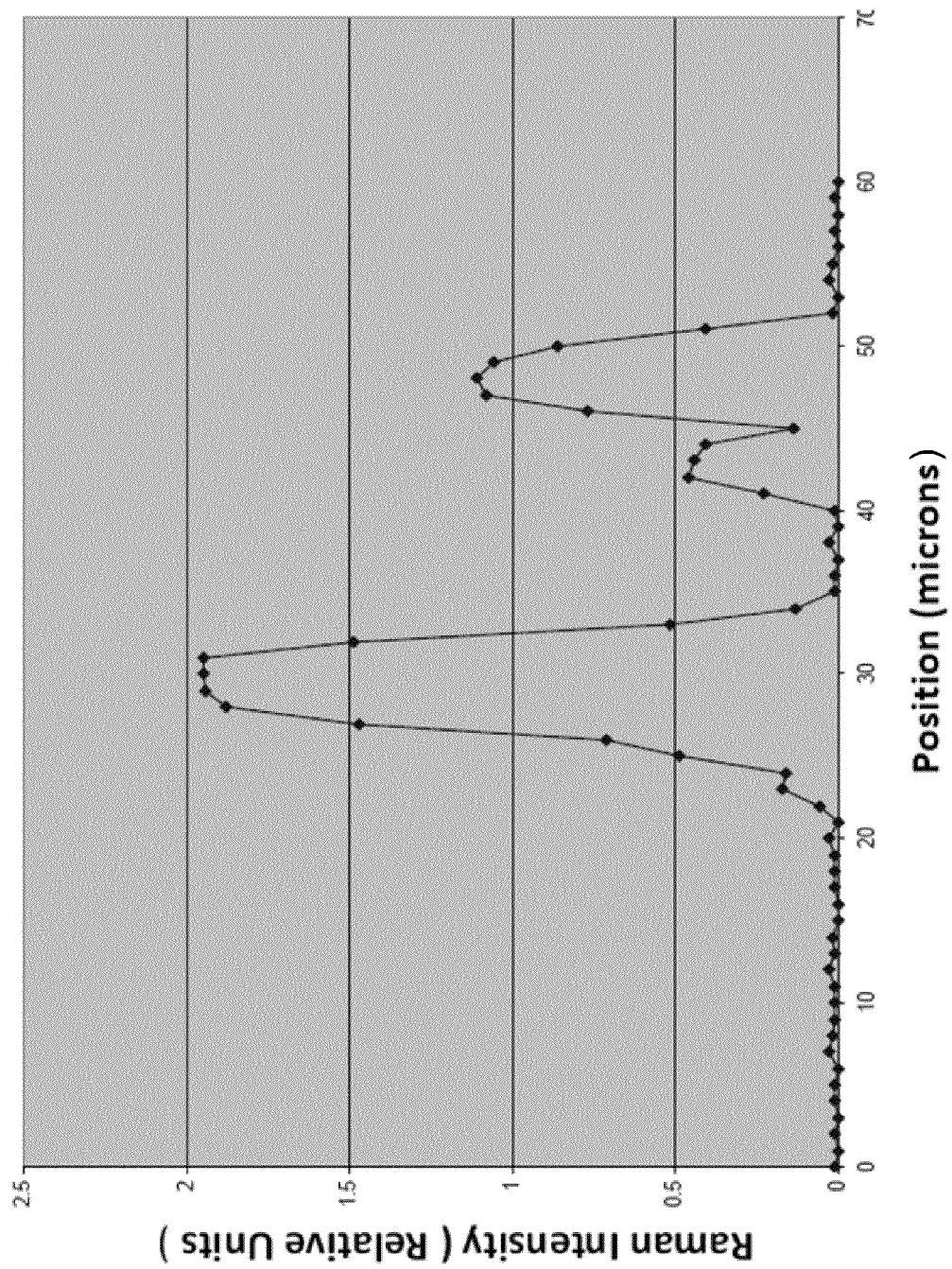
FIG. 7 is a graph of an exemplary Raman response revealing two encoded lines in an object, according to an illustrative embodiment of the invention.

In the case of Raman modification, the electromagnetic or particle irradiation breaks certain bonds which results in vibrational or bending modes of the material being more active or less active. In one embodiment, scanning the encoded region results in a spatial modulation of the Raman intensity as shown by two lines encoded in an object with particular Raman responses. This spatial modulation can be received as an authentication code, pattern or signature for verifying or tracking the object of interest. In another embodiment, uniform beam interrogation can reveal an image or code by light filtering and imaging with a CCD array. For example, FIG. 7 is a graph of Raman scattering in response to UV excitation that reveals two encoded lines in a plastic object. These encoded lines can either be read or scanned or other wise received as a bar code, authentication code, or authentication signal.

FIG. 1A shows a system 10 suitable for modifying an object 15 and in particular altering a portion thereof which may be considered as a substrate by forming a 2D code 17 such that the code is part of the object 15. An energy or projectile source 18 can be used to direct a electromagnetic radiation towards the object 15. In one embodiment, the source 18 is a laser, electron beam, particle emitter, lamp, light source and a patterned mask, a heat source, or other controllable source of electromagnetic radiation or projectiles. In one embodiment, a beam 20 of particles or radiation is directed to a particular volume of the object 15 such that a 2D code 17 can be written or formed. The beam 20 can be moved using a movable controller or head. Alternatively, the object 15 can be translated in space while the beam remains stationary. In one embodiment, a pulsed laser can be used as the laser source 18. In some embodiments, the laser is a pulsed Nd:YAG laser. In some embodiments, the laser modifies a dopant contained in the material that forms the object, thereby changing the optical properties of the material where the code is written or formed. Suitable dopants include, by way of non-limiting example, alkali metal, nanocrystals, and semiconductor dopants.

In another embodiment, the beam impinges or other chemical bond breaking phenomena or structural defect changing device is applied to a predetermined area of the object such that a code can be written. Specific coordinates for determining the spatial movement of the object or the program for scanning the beam can be entered using a computer 22 or controller. The computer 22 can also include a display 24 that can depict a three-dimensional model of the object 15 such that the position of the 2D code within or on the object 15 can be visualized and selected with an input device 26 such as a mouse, keyboard, tablet, or other device, or combination of the foregoing.

In turn, and still with respect to FIG. 1A, a beam director 28 such as a lens can be used to focus the laser beam 20 at various positions within the selected region of the object 15 to receive the 2D code. Since the beam director allows the code writing to occur 1 mm, 2 mm or any other distance in which the beam contacts the substrate which constitutes the object, it is clear that the object (e.g., a bottle or syringe) would need to be destroyed or damaged to try and remove or extract the code by a counterfeiter.

Once a 2D code 17 has been formed in or on the object 15, to authenticate the object or test the success of the writing process, additional steps are performed such as shown in FIG. 1B. In FIG. 1B, a hand held scanner 27 is shown reading the code 17 which has been formed in the object 15 in the presence of a code illuminating light source 30 such as UV, IR, or other source. In the absence of the source 30 being present, code 17 is invisible or transparent such that looking at the object 15 would reveal its surface unmarred by a 2D code such as a QR code. However, once the source 30 is turned on, the code 17 appears and be scanned, read, photographed, or otherwise captured for decoding.

At a production facility where the objects are first scanned, a hand held scanner 27 may be practicable. However, if a consumer, seller, distributor, law enforcement agency or other interested party wants to authenticate the object, using a mobile device 29, such as a smart phone with a camera, can take the place of a hand held scanner. QR codes are used for various purposes and are amenable to encoded data of interest relative to the object. This data can include source information, expiration dates, an updated log of transport and storage locations, and other information of interest. Thus, a mobile device 29 can capture codes in the field and allow for authentication and tracking of objects around the world.

Figure 1C:
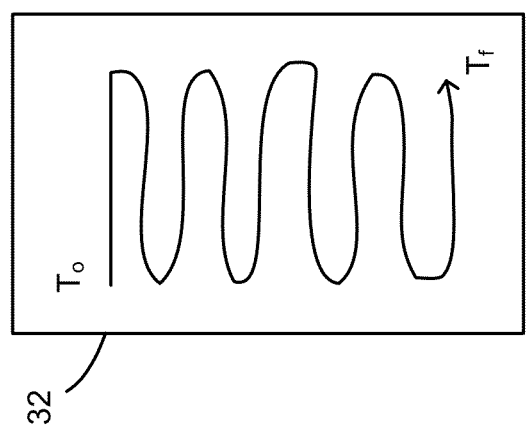
FIG. 1C is a schematic diagram showing a scan pattern of a beam or the movement pattern of an object relative to a beam suitable writing a code on or within an object according to an illustrative embodiment of the invention.

As mentioned above, the beam 20 can be directed to scan a particular pattern over and through an object at a focal depth set by the beam director 28. FIG. 1C shows an exemplary beam tracing pattern. This pattern can result from selectively rotating or otherwise translating the object or the beam. For example, the laser can be programmed to be on for certain portions of the pattern and off for others (or always on but with a varying or specific intensity gradient for different parts of the pattern) such that a code or pattern is formed in the object at the predetermined depth and that remains invisible when not exposed to UV light. An exemplary code that can result from such a pattern and computer controlled laser operation is shown in FIG. 1D, in which a beam is serpentine-scanned from $T_o$ to $T_f$ as shown in FIG. 1C. When the beam or light impinges on or within the substrate, chemical bonds or other structural defects occur in a controlled manner such that a pattern or code is formed therein.

FIG. 1D shows an exemplary 2D code, such as a QR code, that can be written as code 17 as previously described. The rest of the pattern is to link this 2D bar code or QR code to a data base and a cell phone application to track and authenticate the product anywhere around the world and, in particular, pharmaceuticals and vaccines. For a given, two-dimensional code, such as a QR code, various types of information can be encoded. The information encoded can include text, such as the source of the object, the item number of the object, a URL, the contents of the object (e.g., X units of medicine Y) and other data.

Figure 2B:
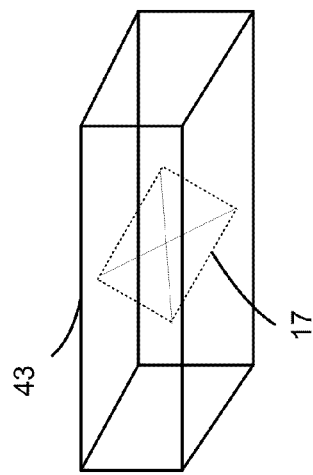
FIGS. 2A-2D are various schematic diagram showing a different views of an object made from a material in which a code has been written on or in the material according to an illustrative embodiment of the invention.
Figure 2A:
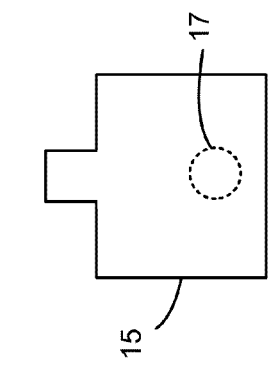

FIG. 2A shows an exemplary object 15 having a 2D code formed in a portion of the substrate that makes up part of the object. The embodiments of the invention can be used with any suitable object capable of receiving a 2D code or a QR code in response to a targeted laser beam. For example, objects can include, without limitation, bottles, vases, ampoules, syringes, perfume bottles, cologne bottles, single malt scotch and other bottles for wine and spirits, coverings for paintings and security boxes, and other containers and other items. Various types of doped or un-doped materials can be used to fabricate the objects 17 before a code is formed in or on such an object. In one embodiment, the material is selected from various types of glass, which can include without limitation, silicate glass, semiconductor nanocrystal (CdS, CdSe, ZnSe, ZnS, PbT) doped glass, phosphate glass, silicate phosphate, and borosilicate glass.

Figure 2D:
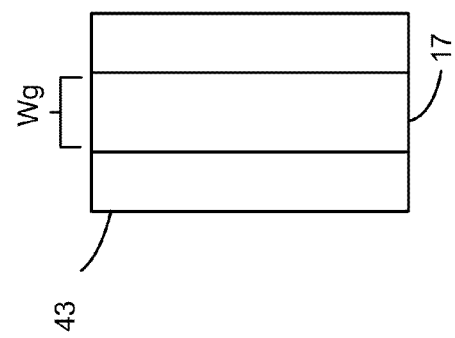
Figure 2C:
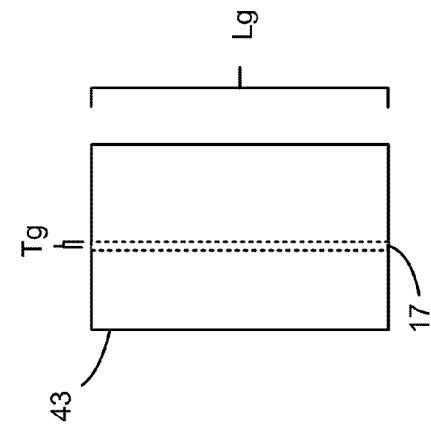

FIG. 2B shows a two dimensional region positioned within a substrate 43. This substrate 43 can be part of an object 15 such as that shown in the preceding figures. Within the two dimensional region shown in dotted lines a 2D code 17 can be written such as a QR code, a bar code, or other 2D codes. As shown in FIGS. 2C and 2D, the code 17 that is formed within the substrate 43 can have a length and width which frame the code like a boundary, outside of which no part of the code appears. The code also can have a thickness which can be relatively thin or thick depending on the focusing capabilities of the laser and the dimensions of the object. In some embodiments, the laser focuses on one or more planes within the thickness of the object and can produce more than one spatial plane containing information.

FIG. 3A shows an object 45 that has been selected or fabricated to facilitate formation of a 2D code within the substrate that constitutes the object. As shown, region 50 on the current viewable surface of the object 45 is not being written upon or modified. In contrast, region 55 has a length (L) and a width (W) that defines a substantially rectangular region or volume in which the 2D code shown in FIG. 3B will be written. Again, in FIG. 3A no code has been written yet, but the computer controlling the beam depicted in FIG. 1A has been programmed with respect to the region 55 where the beam will be directed and where the code will be written by modifying a plurality of regions with the larger region 55.

In FIG. 3B, a 2D code 17, such as a QR code has been written in region 55. The 2D code 17 that has been written in or on the substrate and within the boundary of region 55 is only visible because of the presence of light of wavelength about $\lambda_1$ or wavelength range from about $\lambda_1$ to about $\lambda_2$. Further, as shown, the visible code 17, is made up of a plurality of regions (shown as regions 60a-60e) which are a subset of the larger region 55. Each of these regions 60a-60e has a UV response that is substantially the same with respect to each other, in one embodiment.

In one embodiment, the object in which the code is formed is identified or pre-screened such that the object includes a feature such as significant band to band absorption, structural defects, hole traps, electron traps, or other features that cause the object to fluoresce when exposed to a first wavelength $\lambda_1$ at a second wavelength $\lambda_2$.

In a preferred embodiment, $\lambda_1$ is non-visible electromagnetic radiation and is $\lambda_2$ visible electromagnetic radiation. In one embodiment, $\lambda_1$ and $\lambda_2$ are both in the ultraviolet range. In one embodiment, one of $\lambda_1$ and $\lambda_2$ corresponds to the short wavelength sub-range of the UV range and one of $\lambda_1$ and $\lambda_2$ corresponds to the long sub-range of the UV range. In another embodiment, $\lambda_1$ and $\lambda_2$ are both selected from regions of the electromagnetic spectrum that exclude visible light.

In one embodiment, the regions 60a-60e are formed by applying a beam to change the UV response of those regions such that the code 17 of FIG. 3B is visible when exposed to at least one of $\lambda_1$ and $\lambda_2$ but not when exposed to visible light. For example, in FIG. 3C, only visible light is applied to the region 55 and no code is visible.

Figure 4:
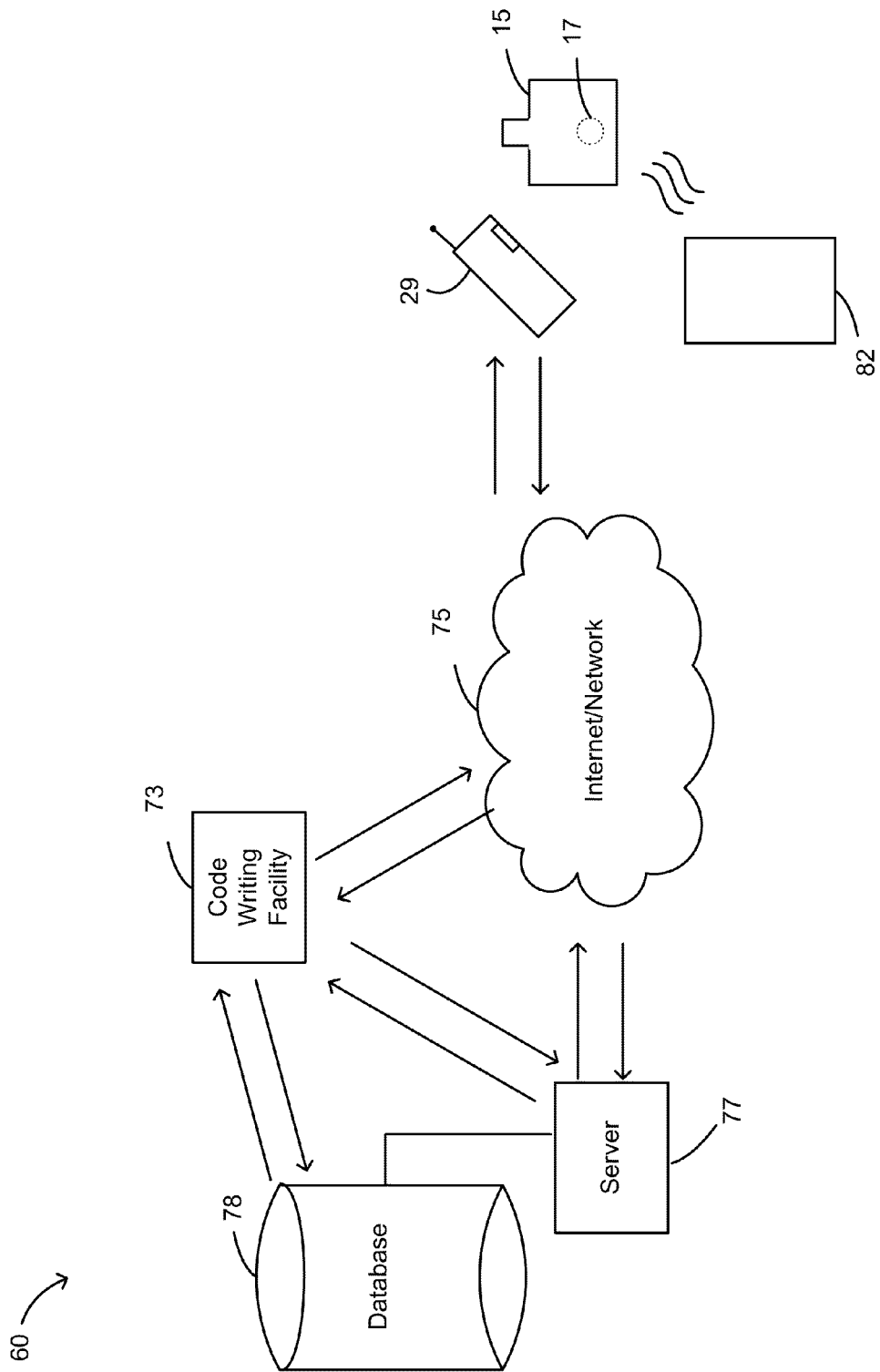
FIG. 4 is a schematic diagram showing a network-based system suitable for tracking one or more objects having a code written therein or thereon according to an illustrative embodiment of the invention.

Another embodiment of the invention relates to pairing the authentication features with inventory tracking and reporting with respect to the objects. An exemplary system 62 is shown in FIG. 4 that includes a code writing facility 73. At this facility the code forming or writing steps described in FIG. 5A (or others) can be performed using a system like that shown in FIG. 1A to encode objects that are either preselected or otherwise made for the purpose of encoding them with a 2D code. The facility 73 is bi-directionally or uni-directionally connected to a communication network 75 such as the Internet 75. A server 77 and a database 78 may be located at the facility 73 and directly connected thereto or remote from the facility 73, but connected via a network 75.

Each time a code is written with respect to a object of interest that particular object can receive an identifier that is part of or locatable by using the code. That identifier, the contents of the code, or any other data encoded by or accessible by the code can be stored and managed by the database 78 running on server 77.

In turn, as shown on the right side of FIG. 4, when a mobile device 29 reads a two dimensional code 17, such as a QR code, from a object 15, in the presence of a source of electromagnetic radiation of a wavelength or a wavelength range 82 that renders the code 17 readable by the mobile device 29 the mobile device can decode the code 17 or, if the code 17 includes a URL or other commands, it can be directed the mobile device to an inventor tracker for the object.

Figure 6B:
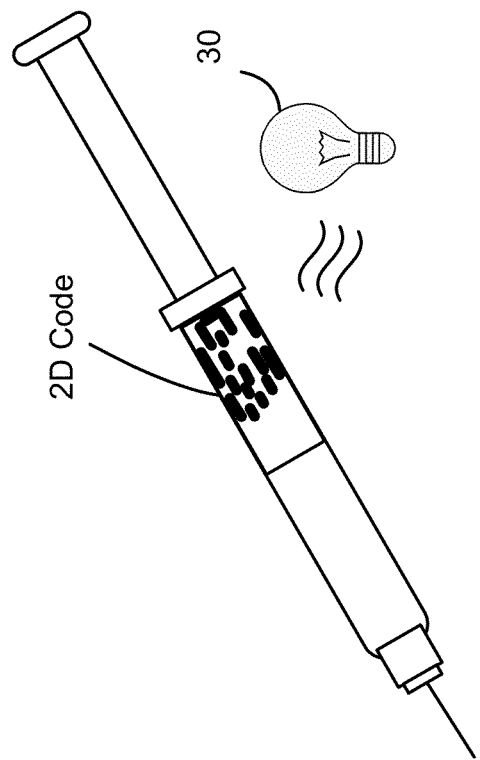
FIGS. 6A and 6B are schematic diagrams of a syringe having a 2D code formed in the chamber sidewall in which a source of light used to make the code visible is not active and then active, respectively, according to an illustrative embodiment of the invention.
Figure 6A:
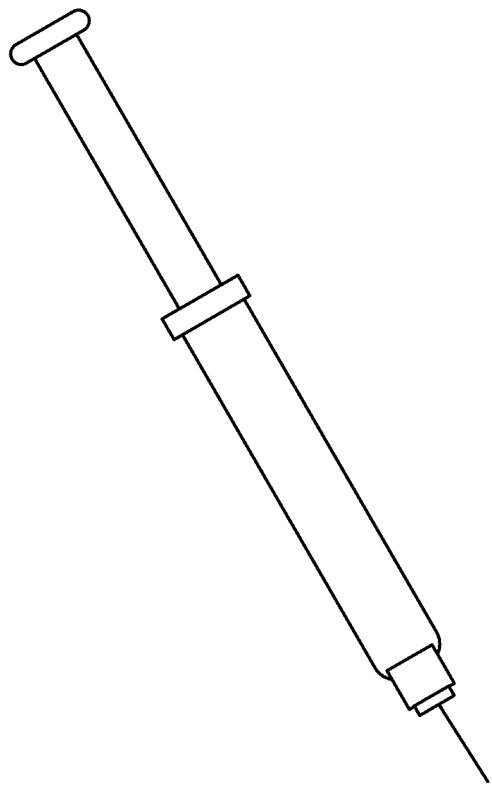

In one embodiment, the code 17 is a QR code which can be used for nearly instantaneous data base checking and verification from anywhere around the world using a cell phone camera application. The combination of authentication technology and QR codes can track and authenticate pharmaceuticals and other packaged products anywhere in the world. FIGS. 6A and 6B show a syringe that is preloaded with a vaccine. In FIG. 6A the syringe has been coded by exposing it to the code forming process, but there is not suitable code illuminating light to see the code. In FIG. 6B the appropriate wavelength of code illuminating light is being applied and the code is visible. Clearly, in order to remove the bar codes, one would have to actually remove several millimeters of the ampoule or the syringe, which is simply not possible. As a result, the use of the embodiments described herein to safeguard medicines and track them has many advantages.

Figure 5A:
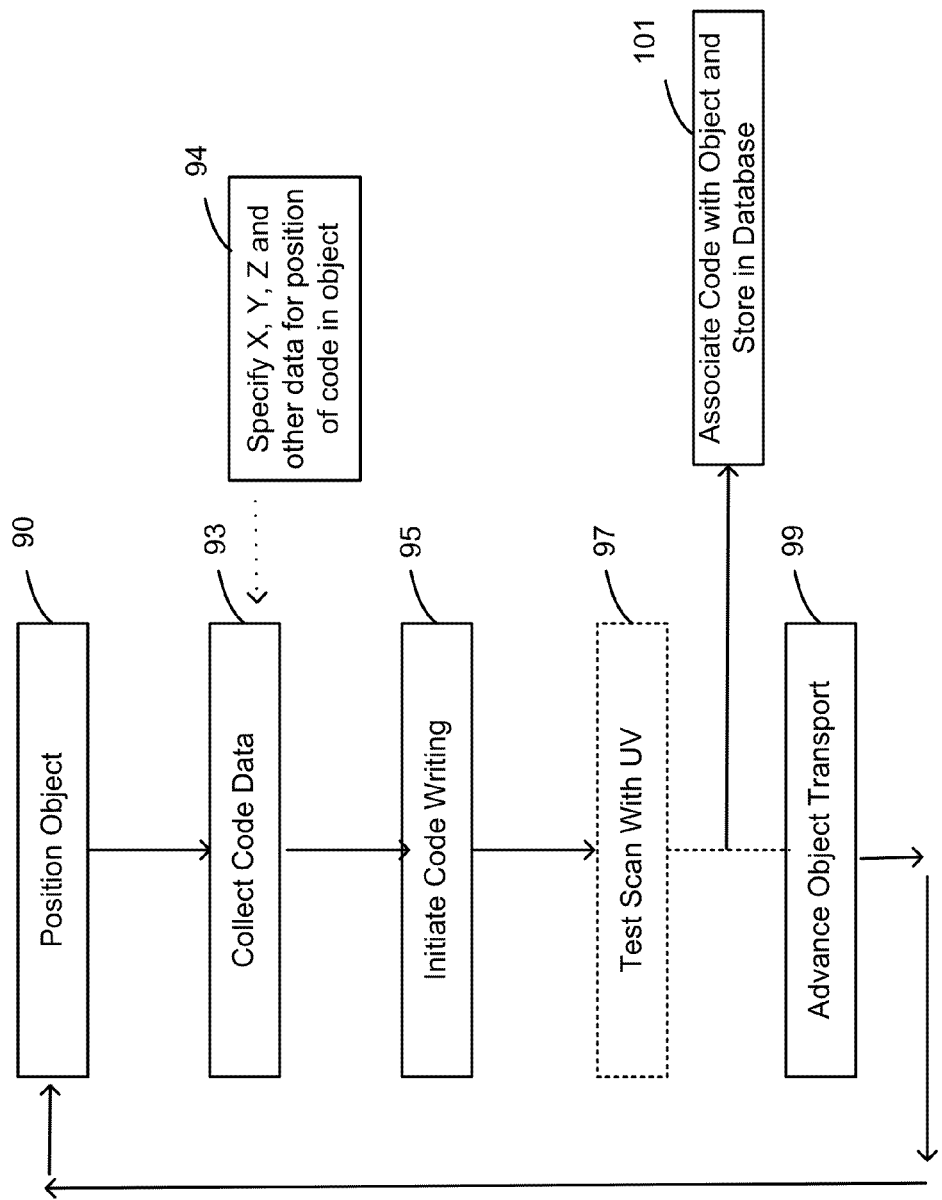
FIGS. 5A and 5B are process flows showing representative non-limiting code writing and code scanning steps.

In FIG. 5A, a process flow showing an exemplary sequence of steps for forming a code in an object as part of assembly line type process is shown. Initially, the system positions 90 the object. The system collects code data 93, such a format, and other parameters. In addition, the system also collects positional and coordinate data, such as where in the object the code should be written. Once this information has been transferred, the code writing process commences 95. After the code has been written, it can optionally be tested. Any relevant code data, such as manufacturer data, or object data is stored in the database 101. Next, the covertly encoded object is advanced and a new object is aligned with the laser source. This process continues until all of the objects in the batch are processed.

Figure 5B:
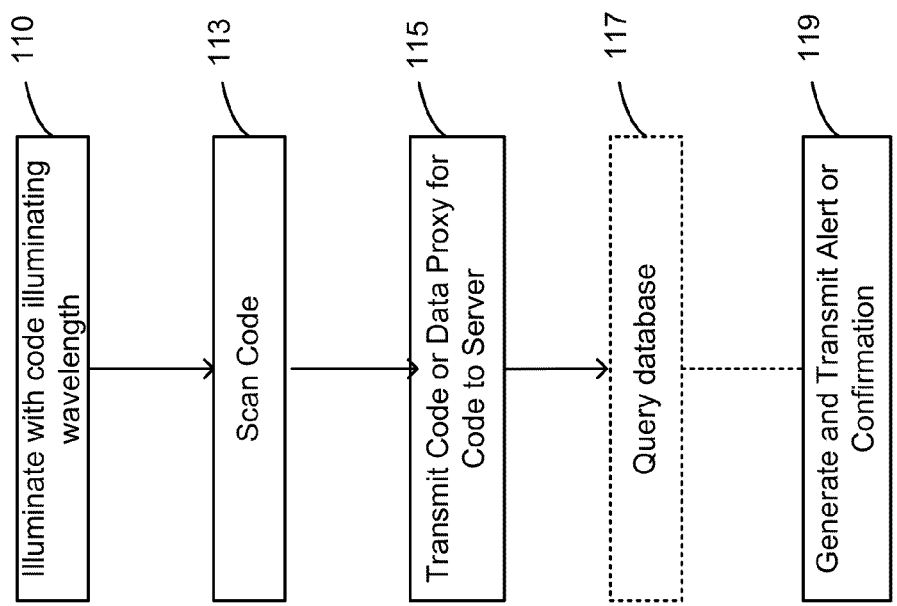

Similarly, in FIG. 5B, a parallel process flow relating to an exemplary sequence of steps for the scanning part of the process is shown. Initially, the object is illuminated 110 with the code illuminating wavelength needed to read the code. Next, the code is scanned 113. In one embodiment, a mobile device or a hand scanner performs the code reading 115. Once scanned, the code may be sent directly or transmitted as proxy data correlated with the code. A database containing information is queried 117 regarding past scans of the code, where it was scanned, if it has been retired or destroyed, etc. If the scan of the object runs afoul of a threshold or rule relative to the events stored in the database, an alert questioning the authenticity of the object can be generated 119.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A security feature for authenticating an object comprising:
   a substrate comprising a first material and having a length (Lg) and a width (Wg); and
   an authenticable two-dimensional code that is not visible until exposed to an excitation source, said code comprising at least one region, the at least one region disposed in the first material, wherein the at least one region comprises a physically changed portion of the first material that creates a second material derived from the first material,
   wherein the first material and the second material are non-emissive when exposed to visible light, wherein the second material emits visible light to a greater degree than the first material when exposed to electromagnetic radiation that substantially excludes visible light.

2. The security feature of claim 1 wherein the two-dimensional code or pattern is configured to be substantially invisible to a person when exposed to visible light and readable during when exposed to electromagnetic radiation that substantially excludes visible light at ambient conditions.

3. The security feature of claim 1 wherein the two-dimensional code is selected from the group consisting of a quick response code, a one-dimensional bar code, a line, a glyph, a logo, a plurality of lines, or a two-dimensional bar code.

4. The security feature of claim 1 wherein the substrate comprises glass selected from the group consisting of silicate glass, nanocrystal doped glass, phosphate glass, silicate phosphate, and borophospate and soda lime glass.

5. The security feature of claim 1 wherein the second material comprises an electromagnetic radiation responsive element selected from the group consisting of a dopant, a defect, a broken bond or structural change, a compound having a Raman scattering signature that differs from that of the first material.

6. The security feature of claim 1 wherein the substrate further comprises a dopant, the dopant selected from the group consisting of an alkali metal, a nanocrystal, and a semiconductor dopant.

7. The security feature of claim 1 wherein the two-dimensional code has a boundary defined by Lg and Wg and wherein the first material has a first Raman scattering signature and the second material has a second Raman scattering signature that is detectably different from the first Raman scattering signature.

8. The security feature of claim 1 wherein the substrate is part of the object and wherein the object is selected from the group consisting of a bottle, a syringe, a test tube, an ampoule, a container, and a sculpture.

9. The security feature of claim 1 wherein the two-dimensional code comprises identifier information such that the substrate is trackable by scanning the two-dimensional code.

10. A method of fabricating an authenticable object comprising:
    determining a position within an object comprising a first material for a target area to bound a two-dimensional code;
    exposing a plurality of locations in the object, within the target area, to a particle or electromagnetic radiation beam, such that a second material is formed from the first material, the two-dimensional code comprising a pattern of regions corresponding to the plurality of locations; and
    associating the two-dimensional code with the authenticable object in a database.

11. The method of claim 10 wherein second material emits light to a detectably greater degree than the first material when exposed to electromagnetic radiation that substantially excludes visible light.

12. The method of claim 10 wherein the beam originates from a laser and wherein the second material fluoresces when exposed to $\lambda_1$ and does not fluoresce when exposed to $\lambda_2$.

13. The method of claim 10 wherein the target region bounds the two-dimensional code.

14. The method of claim 12 further comprising the step of exposing the object to $\lambda_1$ and scanning the two-dimensional code using a mobile device.

15. The method of claim 14 further comprising the step of storing data associated with the object in a database, the information accessible after the code has been scanned by a mobile device.

16. An object encoding system comprising:
    a computer comprising a processor, a memory device, wherein the memory device comprises instructions that when executed by the processor cause the processor to:
    select the time, duration, and pattern of a particle or electromagnetic radiation beam before scanning an object;
    scan an object with the beam such that the beam is on and off for periods of time; and
    encode a two-dimensional pattern in the object that is selectively readable when exposed to a wavelength of electromagnetic radiation having a wavelength greater than about 700 nm and less than about 400 nm.

17. The object encoding system of claim 16 wherein the two-dimensional pattern is selected from the group consisting of a quick response code, a one-dimensional bar code, a line, a glyph, a logo, a plurality of lines, or a two-dimensional bar code.

18. The object encoding system of claim 16 wherein the object comprises an element selected from the group consisting of a dopant, a defect, a broken bond, an electron trap and a hole trap.

19. The method of claim 16 further comprising the step of exposing the object to a wavelength of light $\lambda_1$ and scanning the two-dimensional code using a mobile device.

* * * * *